May 17, 1960     I. L. BREIER ET AL     2,937,212
PRODUCTION OF DIARYLMETHANES
Filed July 10, 1958
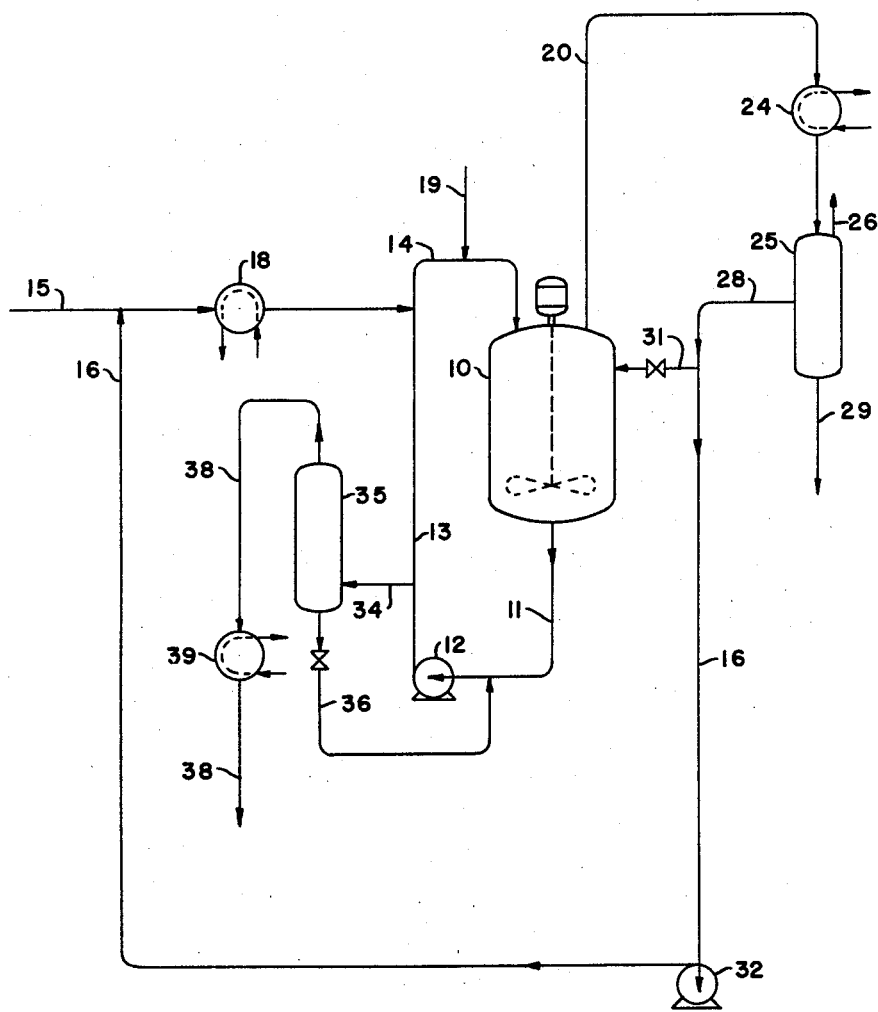
INVENTORS:
I. L. BREIER
H. A. CHENEY
R. F. KNOTT
BY: *Martin S. Baer*
THEIR ATTORNEY

United States Patent Office 2,937,212
Patented May 17, 1960

2,937,212
PRODUCTION OF DIARYLMETHANES

Irwin L. Breier, Lafayette, Harry A. Cheney, Berkeley, and Robert F. Knott, San Lorenzo, Calif., assignors to Shell Oil Company, a corporation of Delaware Application July 10, 1958, Serial No. 747,661

17 Claims. (Cl. 260—668)

This invention relates to a process for the production of diarylmethanes and more specifically to an improved process for the production of diarylmethanes by condensation of aromatic hydrocarbons with formaldehyde in the presence of sulfuric acid catalyst.

It is a principal object of this invention to provide an improved process for the production of condensation products of aromatic hydrocarbons and formaldehyde containing mainly diarylmethanes. It is a further object to provide an improved process for converting aromatic hydrocarbons and formaldehyde into diarylmethanes in high yield with high selectivity. A further object of the invention is to provide a commercially suitable process for the production of diarylmethanes. It is a specific object of the present invention to provide an improved method for preparing the bis-diarylmethane compounds in which the aryl groups are tolyl, xylyl, and trimethylphenyl, respectively. Other objects of the present invention will appear from the following description thereof, which will be made with reference to the accompanying drawing, the single figure thereof representing a schematic flow diagram of a preferred mode of practicing the invention.

It is known to prepare diarylmethanes by the reaction of aromatic hydrocarbons with formaldehyde. Schematically, the reaction is:

$$2\ ArH + HCHO \rightarrow Ar\text{—}CH_2\text{—}Ar + H_2O$$

where Ar represents an aryl group, e.g., phenyl, tolyl, xylyl, etc. In general, some heavier reaction product, e.g., triaryldimethane (Ar—$CH_2$—Ar—$CH_2$—Ar), is also produced. For convenience, these compounds may be referred to hereafter as monomer (ArH), dimer (Ar—$CH_2$—Ar) and trimer

(Ar—$CH_2$—Ar—$CH_2$—Ar).

The earliest workers in the field used as catalyst for this reaction concentrated sulfuric acid, modified by addition of large amounts of acetic acid to moderate the reaction and to suppress the formation of resinous compounds.

British Patent No. 446,450 discloses an improved process in which ethanol is used as the diluting agent for sulfuric acid.

A method of preparing ditolylmethane by reacting toluene with paraformaldehyde in the presence of sulfuric acid of 70 to 80% concentration as catalyst, in which a solution of paraformaldehyde in toluene is bubbled through a column of sulfuric acid, is described in U.S. 2,761,884.

Each of the processes known to the prior art suffers from drawbacks which make it undesirable for large-scale commercial production of diarylmethanes. The use of acetic acid or alcohol as acid modifier in the substantial amounts required is excessively expensive. The acetic acid modified process or the use of paraldehyde in accordance with the above-mentioned U.S. patent results in the formation of substantial concentrations of resins. The prior art preparations generally operate at relatively low temperatures which make it difficult to employ aqueous formalin, the most readily-available commercial form of formaldehyde, because the excess water remains in the sulfuric acid and dilutes it. They generally require excessively long reaction times and excessively high ratios of aromatics to formaldehyde.

The present invention provides an improved method for converting alkyl-substituted aromatic hydrocarbons having at least one unsubstituted nuclear carbon atom into diarylmethanes in high yield with high selectivity by condensation with formaldehyde in a process suitable for commercial use. Briefly, the present invention provides a process for the production of diarylmethanes by contacting formaldehyde with a suitable aromatic hydrocarbon feed at a temperature in the range from about 100° to about 170° C., preferably from about 100° to about 135° C., in the presence of sulfuric acid having a concentration in the range from 55 to 70% in which formaldehyde is introduced into the liquid at a controlled rate, a vapor stream containing the water added and that formed in the reaction is continuously withdrawn from the reaction mass and diarylmethanes are recovered from the reaction mass.

A preferred mode of practicing this invention comprises circulating an emulsion of acid catalyst and hydrocarbons through a circuit comprising a vessel, conduits and a pump, adding fresh hydrocarbon feed to the emulsion, adding formaldehyde at a point where a substantial concentration of unreacted feed is present, withdrawing water vapor from the vessel and recovering aromatic product from a liquid bleed stream.

It has also been found that this process can be carried out in carbon steel equipment without excessive corrosion by adding a compound of trivalent arsenic to the reaction mixture and maintaining an acid-to-hydrocarbon volume ratio of not less than 1:1, so that the acid is the continuous phase.

A further improvement of this invention comprises adding from 2 to 10% by weight of an ether alcohol having from three to six carbon atoms per molecule to the acid catalyst. This modifies the product distribution in a favorable manner, resulting in a product having an increased concentration of diarylmethanes. Useful additives are, for example, diethylene glycol, triethylene glycol, dipropylene glycol and the methyl and ethyl ethers of ethylene glycol.

The various modes of carrying out this invention will be better understood from the following detailed description.

Suitable hydrocarbon feed stocks for the present invention are alkyl-substituted monocyclic aromatic hydrocarbons containing at least one unsubstituted nuclear carbon atom. The reactivity of aromatic hydrocarbons with formaldehyde under the conditions of the present invention increases as the number of alkyl substituents in the ring increases. Monocyclic alkylaromatic hydrocarbons containing at least one unsubstituted nuclear carbon atom, and having no more than six carbon atoms in any one alkyl group and no more than fifteen carbon atoms per molecule, are preferred feed stocks. Especially preferred feed stocks are the mono- to penta-methylbenzenes, namely toluene; the xylenes, either as the individual isomers, preferably ortho- and meta-xylene, or as mixed xylenes, including paraxylene; the trimethylbenzenes, either as the individual isomers hemimellitene, pseudocumene and mesitylene or as a mixture of the isomers; the tetramethylbenzenes, either as the individual isomers, particularly prehnitene and isodurene, or as a mixture of the isomers, including durene; and pentamethylbenzene. Generally preferred as aromatic hydrocarbon feeds in the present invention are toluene, mixed xylenes, and pseudocumene.

Aromatics having alkyl substituents other than methyl groups can be employed as feed stocks for the present invention, including, for example, ethylbenzene, ethyltoluenes, ethylxylenes, diethylbenzenes, cumene, isopropyl toluenes, isopropylxylenes, and the like.

Generally it is desirable to employ the aromatic hydrocarbon feed stock as a relatively pure fraction of a single molecular weight range, e.g., a concentrate of toluene, of xylenes, of trimethylbenzenes or the like. When employing such fractions, the resulting diarylmethanes are substantially of a single molecular weight range and are very suitable for further conversion, e.g. by hydrocracking, into one aromatic compound corresponding to the feed and another corresponding to the feed aromatic having a methyl group added to the aromatic nucleus. The present invention can be also employed, however, for producing mixed diarylmethanes from a hydrocarbon feed stock containing aromatic hydrocarbons of different molecular weights. For example, when it is desired to produce durene from a mixed xylenes feed it is necessary to convert the xylenes to trimethylbenzene predominating in pseudocumene and the latter to durene. Once a trimethylbenzene fraction is available, it is suitable to charge a mixture of xylenes and trimethylbenzenes to a single formaldehyde alkylation zone. The resulting mixed diarylmethanes are then converted to arylmethanes by hydrocracking. Durene is removed from the product, and xylenes and pseudocumene are recycled to the alkylation.

The condensation products produced according to the present invention are suitable for use as high-boiling aromatic solvents, as charge stocks to a hydrocracking step to produce methylated aromatics, or as intermediates in the production of insecticides or of wetting agents.

The diarylmethane compounds resulting from the use of toluene, mixed xylenes, pseudocumene, mesitylene and mixed tetramethylbenzenes as feed stocks are suitably hydrocracked in accordance with the method described in U.S. Patent 2,819,322 of L. C. Fetterly issued January 7, 1958, to produce in substantial yield paraxylene, pseudocumene, durene, isodurene and pentamethylbenzene, respectively.

It is important in the present invention that the formaldehyde be added to a mixture of aromatic hydrocarbon feed and liquid catalyst and that it be added at a controlled rate such that the amount of monomeric formaldehyde entering the liquid phase at any one time is no more than can be substantially completely reacted with the aromatic in a short period, e.g., less than one minute. It is, therefore, preferred to add the formaldehyde in the form of formaldehyde monomer, either anhydrous or aqueous, at a controlled rate. When non-aqueous monomeric formaldehyde is used, it may be charged to the reaction zone as a gas or in solution in organic liquid, e.g., in part of the aromatic hydrocarbon feed stock. The aqueous formaldehyde may be charged as a liquid or a vapor stream.

The prior art workers have generally found the use of aqueous formaldehyde, such as formalin, to be undesirable in the production of diarylmethanes because of the large amount of water thus added to the reaction zone, which dilutes and deactivates the catalysts. In operating according to the present invention, aqueous formaldehyde solution such as formalin is the preferred form in which to charge the formaldehyde to the reaction zone. The formaldehyde solution may contain from 1 to 60%, by weight, or more of formaldehyde. A concentration between 30 and 50% is preferred; commercial formalin of about 37% formaldehyde content is especially suitable.

The catalyst employed in the process of this invention is aqueous sulfuric acid having a concentration in the range from 55 to 70% $H_2SO_4$. Best results are obtained with acid having a concentration from 60 to 70% by weight. At lower concentrations of acid, the conversion of aromatics and aldehyde drops off very rapidly so that with 50% acid the conversion is only about 30% of theoretical and with 40% acid only about 10% of theoretical. This compares with conversions of 80 to 90% or more of theoretical when using the preferred concentration of acid. When acid having a concentration of over 70% is employed, the ratio of diarylmethane (dimer) to triaryldimethane (trimer) drops off very rapidly. This ratio is about eight to nine parts or more of dimer to one of trimer when using acid in the preferred concentration range and drops off to less than 5:1 with 75% acid.

When the catalyst employed is plain aqueous sulfuric acid, the condensation product obtained in runs carried out in accordance with this invention consists of at least 70% and generally between 75 and 80% of the diarylmethanes, the remainder being mainly trimer and tetramer.

The yield of dimer relative to trimer and higher can be substantially increased by adding to the sulfuric acid from about 2 to about 10% by weight of an ether alcohol having from three to six carbon atoms per molecule. Thus, when the catalyst contains from 2 to 10% by weight of diethylene glycol, 31 to 23% water and 67% $H_2SO_4$, the proportion of dimer in the monomer-free product is about 85 to 87% by weight, similarly good results are obtained with the methyl ether of ethylene glycol. With unmodified sulfuric acid, the dimer concentration is about 77%, and with 15% diethylene glycol it is about 73% in the conversion of alkylbenzenes at otherwise equal conditions.

It was found that, at the conditions employed in the process of this invention, methanol and ethanol are not desirable modifiers of sulfuric acid. The addition of methanol to the acid had the undesired effect of converting a substantial amount of methanol to dimethyl ether. The methanol which may be present in commercial formalin is not objectionable. Ethanol caused excessive sludge formation. The probable reason why such alcohols cannot be used as acid modifiers in this process whereas they are desirable in the process of the British patent is that the present process operates at substantially higher temperatures. It is also shown above that a high concentration of diethylene glycol, though still less than the amount of alcohol required in the prior art method when converting an alkylbenzene, is undesirable in that results were worse than results obtained with plain aqueous sulfuric acid.

Sulfuric acid of from 55 to 70% concentration is quite corrosive to ferrous metals at 100°–170° C. It was found that adding at least about 0.8% wt. of sodium arsenite ($NaAsO_2$) reduced the corrosivity of the acid at these temperatures to a satisfactorily low value, provided an aromatic hydrocarbon was also present. The corrosivity was excessive in the absence of the aromatic hydrocarbon. However, it was also found that the corrosion rate of steel in contact with the hydrocarbon phase was much greater than that in contact with the acid phase. For example, in runs carried out in mild steel equipment of the kind illustrated by the drawing, the steel corrosion rate was reduced from about 250 mils (0.25 inch) per year to 5–10 mils per year by changing from an emulsion in which the hydrocarbon was the continuous phase to one in which the acid was the continuous phase. The temperature was dropped at the same time from 150° to 130° C. This also tends to reduce the corrosion rate, but not to the very substantial extent actually found.

Various generally available forms of ferrous metals can be used, including carbon steel, cold rolled steel, low-silicon steel and grey cast iron.

Other compounds of arsenic in its trivalent form, e.g., other arsenite salts or $As_2O_3$, may be employed. The concentration is suitably from 0.8 to 5% wt. sodium arsenite or equivalent.

Since the corrosivity of aqueous sulfuric acid, even when inhibited, increases with temperature, all required heat should be supplied to the emulsion by heating the acid-free streams which are added to the emulsion.

The present reaction is carried out in the liquid phase. In the preferred method of operation, an emulsion of aqueous sulfuric acid and a hydrocarbon layer consisting of monomer and product is circulated through a system of conduits containing as part thereof a vessel, preferably one provided with agitating means. Provision is made for withdrawing a vapor stream from the vessel and for withdrawing a liquid bleed stream from some portion of the conduit. Aromatic monomer charge is continually added to the circulating emulsion and aldehyde is added either at the same point at which aromatic is added or at a point downstream therefrom and upstream from the vessel. The temperature in the vessel is maintained sufficiently high to permit prompt removal of all water added to and formed in the reaction mass in the form of a vapor stream comprising mainly the water and some of the charge hydrocarbon. The remainder of the conduit is maintained at a temperature sufficiently high to prevent the precipitation of reaction products as solids. In general the total conduit, including the vessel, is maintained at substantially the same temperature. The required amount of heat is added to acid-free streams entering the system. The vapors withdrawn from the vessel are condensed; the aromatic hydrocarbon is suitably returned to the circulating reaction mass or to the vessel. If unreacted formaldehyde is removed in the vapor stream it will be contained in the water layer of the condensate; such formaldehyde may be recovered and returned to the reaction mass.

The temperature employed in the reaction is at least sufficiently high to permit continuous evaporation of water from the reaction mixture substantially at the rate at which water is added and formed. Temperatures in the range between 100° and 170° C. are suitable. The temperature is preferably at about the boiling point of an individual aromatic hydrocarbon feed or the initial boiling point of an aromatic feed mixture at reaction pressure. When the aromatic to be converted is toluene the temperature is suitably about 100°–110° C.; for xylenes about 115°–135° C. and for trimethylbenzenes about 120°–150° C. but preferably not above about 135° C.

Atmospheric pressure is preferably employed in the process of the present invention. At times it may be desirable to employ somewhat higher pressures to permit operation at higher temperatures, particularly with a relatively low-boiling hydrocarbon, such as toluene, or subatmospheric pressures when converting high-boiling compounds. Thus, pressures from 0.1 to 10 atmospheres are suitable, while a pressure in the range from 1 to 3 atmospheres is generally preferred. Temperature and pressure are correlated so that water is vaporized from the reaction mixture as it is formed and added.

In a continuous system operating with continuous addition of formaldehyde and feed aromatic and continuous withdrawal of a bleed stream of liquid and a vapor stream, as described, the formaldehyde addition is suitably controlled by continually analyzing the condensate from the vapor stream for formaldehyde content and reducing the addition rate of fresh formaldehyde when the formaldehyde content of the vapor stream begins to increase from the steady-state value. When operating under the conditions of the present invention, no substantial concentration of unconverted formaldehyde builds up in the liquid reaction mass.

The ratio of aromatic monomer to unreacted formaldehyde monomer in the steady-state reaction mixture is desirably very high, e.g., from 30 to 2,000 moles or more of aromatic monomer per mole of formaldehyde. Although ratios as low as about 12:1 have been successfully employed when a relatively large increment of formaldehyde was added at one time, it is preferred, for best results, to maintain the ratio in the range between 100 and 2,000:1 by continuous addition of formaldehyde in an amount no greater than that which will react promptly with the aromatic monomer present.

In the processes of the prior art it is generally true that the ratio of aromatic monomer to formaldehyde added to the system must be maintained high, well above the stoichiometric molar ratio, in order to maintain a substantial concentration of monomer in the reaction mass and thus prevent the production of excessive amounts of product heavier than the dimer. The resulting reaction mass necessarily contains a large excess of aromatic monomer over aromatic product.

It has now been found that the ratio of dimer to heavier is not significantly lowered when the hydrocarbon phase of the total steady-state reaction mixture contains even very high relative concentrations of dimer and heavier, e.g. 90% by weight or more. For example a run was made according to the preferred mode including circulation of an emulsion in which the steady-state hydrocarbon phase contained 8% by weight of monomer and 92% by weight dimer and heavier, having a distribution of 80% dimer and 20% heavier product.

In continuous operation the ratio of addition of fresh (extraneous) aromatic monomer to formaldehyde may be as high as the stoichiometric ratio. The concentration of dimer and heavier in the hydrocarbon phase of the reaction mixture may be as high as 90 to 95% by weight. The preferred concentration range of dimer and heavier is from 60 to 90% by weight. Product recovery and utilization is greatly facilitated by maintaining these high concentrations.

When the preferred high concentration of dimer and heavier is present in the reaction mixture, or when the circulating stream has a high ratio of acid to hydrocarbon, it is important to add formaldehyde at a point not upstream from that of aromatic feed addition. This is demonstrated by three runs in which pseudocumene was the aromatic feed and 37% formalin was the formaldehyde feed. The catalyst was 67% $H_2SO_4$, containing 4% diethylene glycol. The recycle rate was about 300 volumes of recycle stream per volume of pseudocumene feed, and conditions were the same in each run, except for the point at which formaldehyde was added. When formaldehyde was introduced ahead of pseudocumene, the $C_9$ conversion was only 42% and the product contained only 61% of dimer relative to heavier product. When formaldehyde was introduced simultaneously with pseudocumene, the $C_9$ conversion was 50% and the dimer concentration in the monomer-free product 84%. When formaldehyde was introduced downstream from the pseudocumene introduction point the $C_9$ conversion was 57% and the dimer concentration 81%.

The ratio of catalyst to hydrocarbon maintained in the reaction zone is preferably in the range between about 1:1 and 10:1 by volume. Lower ratios, from 0.025:1 to 1:1 may be employed. Satisfactory reaction has been obtained with ratios as low as 0.025:1 by volume and very good reaction with ratios in the range from 0.1 to 0.5:1 by volume. However, where the reaction mixture is in contact with mild steel or other corrodable metal, acid-to-hydrocarbon ratios greater than 1:1 are preferred to assure that the acid phase is continuous; this keeps the corrosion rate low. The volume ratio of circulating emulsion to hydrocarbon added is suitably in the range from 10:1 to 1000:1. Although it is preferred to circulate a well-mixed emulsion, it is also possible to operate by circulating a stream consisting substantially of an acid phase.

In numerous runs carried out in accordance with the present invention it has been found that the amount of aromatic hydrocarbon feed reacted was substantially entirely converted to condensation product with formaldehyde, i.e. to the extent of 98% or better.

The process will be further described by means of the sole figure of the drawing which is a schematic flow sheet of a preferred method of operation. When the process is in continuous operation, vessel 10 is filled to a substantial extent with an emulsion of aqueous sulfuric acid, hydrocarbon monomer and hydrocarbon product. Vessel 10 may be an unstirred vessel or it may contain a stirrer or other means to keep the emulsion agitated. Pump 12 causes the emulsion to circulate through lines 11, 13 and 14 back to vessel 10. Fresh aromatic hydrocarbon enters through line 15 and is combined with recycle aromatic from line 16. The hydrocarbons are heated in heater 18 and combined with the circulating emulsion in line 14. Formaldehyde, suitably in the form of formalin having a formaldehyde concentration of about 37%, is added through line 19 and enters line 14 at a point downstream from that at which the aromatic hydrocarbon is added to the circulating emulsion. The mixture is returned to vessel 10.

The amount of heat supplied by heater 18 is such that the temperature of the emulsion in vessel 10 is maintained sufficiently high so that water present in the formalin and water formed in the reaction flash into vapor phase. A vapor mixture of water and hydrocarbon leaves the vessel through line 20. The mixture is substantially completely condensed in water-cooled condenser 24. The condensate passes to accumulator 25 from which remaining gases are removed through vent line 26, a hydrocarbon layer is removed through line 28 and water is removed through line 29 to be discarded. The hydrocarbon withdrawn via line 28 may be directly returned to vessel 10 via valved line 31; it is preferably pumped back to line 15 via line 16 containing pump 32.

Product is withdrawn by taking a bleed stream from line 13 via line 34 to separator 35 wherein the emulsion separates into a hydrocarbon phase and an acid phase. The acid phase is returned to line 11 via valved line 36 and the hydrocarbon phase is removed from the top of separator 35 via line 38 containing cooler 39 and is withdrawn for product work-up by means not shown.

If the water layer withdrawn through line 29 contains a substantial amount of formaldehyde it may be worked up for re-use of the formaldehyde, e.g., by vaporizing the formaldehyde and recycling the vapor stream. The formaldehyde content of the aqueous stream is a function of the completeness of formaldehyde conversion. This is determined by the reactivity of the hydrocarbon charge compound, the catalyst activity and other factors such as temperature which affect the reaction rate and completeness of the reaction, together with the rate of addition of formaldehyde to the reaction zone. The formaldehyde concentration in the aqueous condensate is usually very low or nil.

The liquid hydrocarbon product stream withdrawn through line 38 is a portion of the steady-state reaction mixture. It is suitably passed to a distillation column in which feed aromatics are taken overhead, preferably for return to the reaction system, e.g., via line 15, while reaction product is withdrawn as the heavier fraction. This product consists largely of diarylmethanes and may contain some triarylmethanes and small amounts of higher condensation product. If desired, the product may be rerun to separate a fraction of diarylmethane or of diarylmethane and higher condensation products. The diarylmethane or diarylmethane and higher product is a suitable chemical intermediate in the production of aromatics containing one more methyl group than the feed aromatic. It may be hydrocracked in accordance with the method described in Fetterly, U.S. 2,819,322, to produce a mixture of methylated feed aromatic and unchanged feed aromatic; the latter may be returned for further reaction in the present process. It may be desirable to give the alkylation product a cleanup treatment, e.g. a caustic wash or a clay treat prior to passing it to the hydrocracking step.

Numerous details of the equipment such as pumps, valves, instruments, and the like, have been omitted from the drawing and description. Placement of such components will be readily apparent to the person skilled in the art.

We claim as our invention:

1. A continuous process for the production of diarylmethanes which comprises contacting formaldehyde with an aromatic hydrocarbon having at least one alkyl substituent and at least one unsubstituted nuclear carbon atom in the presence of aqueous sulfuric acid of from 55 to 70% concentration, said formaldehyde and aromatic hydrocarbon being injected into a circulating stream of said acid at different points, the point of injection of the formaldehyde being downstream of the point of injection of the aromatic hydrocarbon.

2. A process according to claim 1 in which the feed aromatic hydrocarbon is a mononuclear aromatic having from one to five methyl substituents.

3. A process according to claim 1 in which the feed aromatic hydrocarbon is toluene.

4. A process according to claim 1 in which the feed aromatic hydrocarbon is a mixture of xylene isomers.

5. A process according to claim 1 in which the feed aromatic hydrocarbon is pseudocumene.

6. A process according to claim 1 in which the feed aromatic hydrocarbon is mesitylene.

7. A process according to claim 1 in which the feed aromatic hydrocarbon is a mixture of trimethylbenzene isomers.

8. A process according to claim 1 in which the feed aromatic hydrocarbon is a mixture of xylene and trimethylbenzene isomers.

9. A process according to claim 1 in which the feed aromatic hydrocarbon is a mixture of tetramethylbenzene isomers.

10. A process for the production of diarylmethanes which comprises establishing a circuit consisting of a vessel and a closed conduit containing a pump and adapted to withdraw liquid from the vessel and return it thereto, continuously circulating through said conduit an emulsion having a continuous phase of aqueous sulfuric acid of from 55 to 70% concentration containing a corrosion-inhibiting amount of trivalent arsenic and a discontinuous hydrocarbon phase containing an aromatic feed hydrocarbon having at least one alkyl substituent and at least one unsubstituted nuclear carbon atom and a condensation product of said feed aromatic and formaldehyde, maintaining said vessel and circulating mixture at a temperature at which water and feed aromatic are vaporized therefrom, continually adding to said circulating emulsion fresh feed aromatic hydrocarbon and recycle aromatic hydrocarbon, continuously adding to said circulating emulsion at a point upstream from said vessel but downstream from the point of injection of said aromatic hydrocarbon a stream comprising formaldehyde, continuously withdrawing from said vessel a vapor stream comprising feed aromatic hydrocarbon and water, condensing said vapor stream, separating a liquid hydrocarbon phase from said condensed vapor stream and returning it to said emulsion, withdrawing from said conduit at a point upstream from the aromatic injection point a liquid bleed stream, separating a hydrocarbon phase from said bleed stream, recovering unconverted feed aromatic from said hydrocarbon phase and returning it to said emulsion and recovering diarylmethane as product from said hydrocarbon phase.

11. A process according to claim 10 in which all heat supplied to the system is added to acid-free streams prior to their being passed into contact with said emulsion.

12. A continuous process for the production of diarylmethanes which comprises contacting formaldehyde with a feed comprising an aromatic hydrocarbon having at least one alkyl substituent and at least one unsubstituted nuclear carbon atom in the presence of aqueous sulfuric acid of from 55 to 70% concentration and at a temperature at which water and the aromatic hydrocarbon are vaporized, said formaldehyde and aromatic hydrocarbon being injected into a circulating stream of said acid at different points to form a reaction mixture, the point of injection of the formaldehyde being downstream of the point of injection of the aromatic hydrocarbon, continually withdrawing from the reaction mixture a vapor stream comprising feed aromatic hydrocarbon and water, condensing the vapor stream, separating a liquid hydrocarbon phase from the condensed vapor stream and returning it to the reaction mixture, withdrawing a liquid bleed stream from the contact mixture, separating a hydrocarbon phase therefrom, and recovering from said hydrocarbon phase diarylmethanes as product.

13. A process for the production of diarylmethanes which comprises contacting formaldehyde with a feed comprising an aromatic hydrocarbon having at least one alkyl substituent and at least one unsubstituted nuclear carbon atom in the presence of aqueous sulfuric acid of from 55 to 70% concentration, said sulfuric acid containing from 2 to 10% by weight of an ether alcohol having two —OH groups and having from three to six carbon atoms per molecule.

14. A process for the production of diarylmethanes which comprises contacting formaldehyde with an aromatic hydrocarbon feed having at least one alkyl substituent and at least one unsubstituted nuclear carbon atom in the presence of aqueous sulfuric acid of from 55 to 70% concentration containing a corrosion-inhibiting amount of a trivalent arsenic compound, said contacting being carried out in contact with ferrous metal.

15. A continuous process for the production of diarylmethanes which comprises establishing a circuit consisting of a vessel and a closed conduit containing a pump and adapted to withdraw liquid from the vessel and return it thereto, continuously circulating through said conduit an emulsion having a continuous phase of aqueous sulfuric acid of from 55 to 70% concentration containing from 2 to 10% by weight of an ether alcohol having two —OH groups and having from three to six carbon atoms per molecule and a discontinuous hydrocarbon phase containing an aromatic feed hydrocarbon having at least one alkyl substituent and having at least one unsubstituted nuclear carbon atom and a condensation product of said feed aromatic and formaldehyde, said condensation product being from about 60% to 90% by volume of said discontinuous hydrocarbon phase, maintaining said vessel and circulating mixture at a temperature at which water and feed aromatic are vaporized therefrom, continually adding to said circulating emulsion fresh feed aromatic hydrocarbon and recycle aromatic hydrocarbon, continuously adding to said circulating emulsion at a point upstream from said vessel and downstream from the point of injection of said aromatic hydrocarbon a stream comprising formaldehyde, continuously withdrawing from said vessel a vapor stream comprising feed aromatic hydrocarbon and water, condensing said vapor stream, separating a liquid hydrocarbon phase from said condensed vapor stream and returning it to said emulsion, withdrawing from said conduit at a point upstream from the aromatic injection point a liquid bleed stream, separating a hydrocarbon phase from said bleed stream, recovering unconverted feed aromatic from said hydrocarbon phase and returning it to said emulsion and recovering diarylmethane as product from said hydrocarbon phase.

16. A continuous process for the production of diarylmethanes which comprises establishing a circuit consisting of a vessel and a closed conduit containing a pump and adapted to withdraw liquid from the vessel and return it thereto, continuously circulating through said conduit an emulsion having a continuous phase of aqueous sulfuric acid of from 55 to 70% concentration containing a corrosion-inhibiting amount of trivalent arsenic and a discontinuous hydrocarbon phase containing an aromatic feed hydrocarbon having at least one alkyl substituent and at least one unsubstituted nuclear carbon atom and a condensation product of said feed aromatic and formaldehyde, said condensation product being from about 60% to 90% by volume of said discontinuous hydrocarbon phase, maintaining said vessel and circulating mixture at a temperature at which water and feed aromatic are vaporized therefrom, continually adding to said circulating emulsion fresh feed aromatic hydrocarbon and recycle aromatic hydrocarbon, continuously adding to said circulating emulsion at a point upstream from said vessel and downstream from the point of injection of said aromatic hydrocarbon a stream comprising formaldehyde, continuously withdrawing from said vessel a vapor stream comprising feed aromatic hydrocarbon and water, condensing said vapor stream, separating a liquid hydrocarbon phase from said condensed vapor stream and returning it to said emulsion, withdrawing from said conduit at a point upstream from the aromatic injection point a liquid bleed stream, separating a hydrocarbon phase from said bleed stream, recovering unconverted feed aromatic from said hydrocarbon phase and returning it to said emulsion and recovering diarylmethane as product from said hydrocarbon phase.

17. A continuous process for the production of diarylmethanes which comprises contacting formaldehyde with a feed comprising an aromatic hydrocarbon having at least one alkyl substituent and at least one unsubstituted nuclear carbon atom in the presence of aqueous sulfuric acid of from 55 to 70% concentration containing from 2 to 10% by weight of an ether alcohol having two —OH groups and having from three to six carbon atoms per molecule and containing a corrosion-inhibiting amount of a trivalent arsenic compound, said contacting being carried out in contact with ferrous metal and said formaldehyde and aromatic hydrocarbon being injected into a circulating stream of said acid at different points, the point of injection of the formaldehyde being downstream of the point of injection of the aromatic hydrocarbon.

References Cited in the file of this patent

UNITED STATES PATENTS

| | | |
|---|---|---|
| 2,411,483 | Wachter | Nov. 19, 1946 |
| 2,819,322 | Fetterly | Jan. 7, 1958 |
| 2,848,509 | Toland et al. | Aug. 19, 1958 |
| 2,850,545 | Fetterly et al. | Sept. 2, 1958 |